(12) United States Patent
Morimura et al.

(10) Patent No.: US 11,260,789 B2
(45) Date of Patent: Mar. 1, 2022

(54) OUT-OF-VEHICLE NOTIFICATION DEVICE

(71) Applicant: TOYOTA JIDOSHA KABUSHIKI KAISHA, Toyota (JP)

(72) Inventors: Junichi Morimura, Sunto-gun (JP); Seiji Arakawa, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/175,217

(22) Filed: Feb. 12, 2021

(65) Prior Publication Data

US 2021/0162917 A1 Jun. 3, 2021

Related U.S. Application Data

(63) Continuation of application No. 16/385,662, filed on Apr. 16, 2019, now Pat. No. 10,946,791.

(30) Foreign Application Priority Data

Apr. 25, 2018 (JP) .............................. JP2018-084346

(51) Int. Cl.
*B60Q 1/26* (2006.01)
*B60Q 1/28* (2006.01)
(Continued)

(52) U.S. Cl.
CPC .............. *B60Q 1/2607* (2013.01); *B60Q 1/28* (2013.01); *B60Q 1/346* (2013.01); *B60Q 1/46* (2013.01); *B60Q 1/2696* (2013.01)

(58) Field of Classification Search
CPC ........ B60Q 1/346; B60Q 1/46; B60Q 1/2607; B60Q 1/2696; B60Q 5/006; B60Q 1/34; B60Q 1/38; G08G 1/0104
See application file for complete search history.

(56) References Cited

U.S. PATENT DOCUMENTS 10,261,513 B2  4/2019  Reiley et al.
10,467,903 B1  11/2019  Chase
(Continued)

FOREIGN PATENT DOCUMENTS

GB  2531084 A * 4/2016 ........... B60Q 1/2661
GB  2531084 A   4/2016
(Continued)

OTHER PUBLICATIONS

Notice of Allowance dated Jan. 9, 2020, which issued during the prosecution of U.S. Appl. No. 16/382,459.
(Continued)

*Primary Examiner* — Mirza F Alam
(74) *Attorney, Agent, or Firm* — Sughrue Mion, PLLC (57) ABSTRACT

An out-of-vehicle notification device includes a moving person detecting unit configured to detect a moving person who is to be notified of information by means of light based on a result of detection performed by an outside situation detecting unit, a plurality of light emitting units, a light emission control unit configured to cause the light emitting units to emit light, and an operating state detecting unit configured to detect operating states of blinkers of the host vehicle. When an operation of the blinker is detected, the light emission control unit forbids light emission of the light emitting unit that is provided within a predetermined area around the blinker in operation.

12 Claims, 6 Drawing Sheets

(51) Int. Cl.
B60Q 1/46 (2006.01)
B60Q 1/34 (2006.01)

(56) References Cited

U.S. PATENT DOCUMENTS

| | | | |
|---|---|---|---|
| 10,640,035 B2 | 5/2020 | Morimura | |
| 2011/0234422 A1* | 9/2011 | Yamashita | B60Q 9/008 |
| | | | 340/901 |
| 2014/0062685 A1* | 3/2014 | Tamatsu | B60Q 5/005 |
| | | | 340/425.5 |
| 2015/0258928 A1* | 9/2015 | Goto | B60Q 1/24 |
| | | | 701/49 |
| 2018/0173237 A1* | 6/2018 | Reiley | G05D 1/0061 |
| 2018/0276986 A1 | 9/2018 | Delp | |
| 2019/0168664 A1* | 6/2019 | Tatara | B60Q 1/38 |

FOREIGN PATENT DOCUMENTS

| | | |
|---|---|---|
| JP | 2009-12553 A | 1/2009 |
| JP | 2014-46838 A | 3/2014 |
| JP | 2015-186944 A | 10/2015 |
| WO | 2018/021063 A1 | 2/2018 |

OTHER PUBLICATIONS

Notice of Allowance dated Oct. 20, 2020, which issued during the prosecution of U.S. Appl. No. 16/827,178.
U.S. Appl. No. 16/382,459, filed Apr. 12, 2019.

* cited by examiner

OUT-OF-VEHICLE NOTIFICATION DEVICE

CROSS-REFERENCE TO RELATED APPLICATION

This application is a continuation of U.S. application Ser. No. 16/385,662 filed Apr. 16, 2019 (allowed), which claims the benefit of priority from Japanese Patent Application No. 2018-084346, filed on Apr. 25, 2018. The entire disclosures of the prior applications are considered part of the disclosure of the accompanying continuation application, and are hereby incorporated by reference.

TECHNICAL FIELD

The present disclosure relates to an out-of-vehicle notification device that performs notification with respect to the outside of a vehicle by using light.

BACKGROUND

A device that provides information related to traveling of a vehicle to a nearby pedestrian from the vehicle while the vehicle is being automatically driven is described in specification of UK Unexamined Patent Publication No. 2531084. The device notifies the pedestrian of information on whether to make way for the pedestrian or not by causing a light emitting unit to emit light. Accordingly, the pedestrian can act according to the notification.

SUMMARY

In the case of the device described in specification of UK Unexamined Patent Publication No. 2531084, it is difficult to distinguish between light emitted from the light emitting unit and light (flickering) emitted from a blinker of the vehicle when the blinker is operated while notification about information is being performed with the light emitting unit emitting light and thus there is a possibility of a decrease in visibility of the light emitting unit and the blinker. Therefore, in this technical field, an out-of-vehicle notification device, with which it is possible to suppress a decrease in visibility of the light emitting unit and the blinker even when the blinker is operated while the light emitting unit is emitting light, is desired.

An out-of-vehicle notification device according to an aspect of the present disclosure is an out-of-vehicle notification device which notifies a moving person in a vicinity of a host vehicle of information by using light, the device including: an outside situation detecting unit configured to detect a situation in the vicinity of the host vehicle; a moving person detecting unit configured to detect the moving person who is to be notified of information by means of light based on a result of detection performed by the outside situation detecting unit; a plurality of light emitting units provided on an outer surface of the host vehicle, the light emitting units being configured to perform notification about information by emitting light; a light emission control unit configured to cause the light emitting units to emit light when the moving person detecting unit detects the moving person to be notified; and an operating state detecting unit configured to detect operating states of blinkers of the host vehicle. The light emission control unit is configured to forbid light emission of the light emitting unit that is provided within a predetermined area around the blinker in operation when the operating state detecting unit detects an operation of the blinker.

When an operation of the blinker is detected, the out-of-vehicle notification device forbids light emission of the light emitting unit that is provided within the predetermined area around the blinker in operation. That is, when an operation of the blinker is detected, only the light emitting unit that is provided at a position separated from the blinker in operation emits light, from among the light emitting units.

Therefore, the moving person in the vicinity of the host vehicle can visually recognize light emitted from the light emitting unit and light emitted from the blinker while distinguishing between the light emitted from the light emitting unit and the light (flickering) emitted from the blinker with ease. As described above, the out-of-vehicle notification device can suppress a decrease in visibility of the light emitting unit and the blinker even when the blinker is operated while the light emitting unit is emitting light.

In the out-of-vehicle notification device, the light emission control unit may be configured to forbid light emission of the light emitting unit that is provided on a side of the blinker in operation from among the plurality of light emitting units provided on the outer surface of the host vehicle and not to forbid light emission of the light emitting unit that is provided on a side of the blinker not in operation when the operating state detecting unit detects an operation of the blinker. In this case, the out-of-vehicle notification device can also forbid light emission of the light emitting unit provided at a position separated from the blinker according to the operating state of the blinker. Therefore, the moving person can visually recognize the blinker in operation without being confused by light emitted from the light emitting unit provided on the side of the blinker in operation. In addition, the out-of-vehicle notification device can notify a moving person, who is on the side of the blinker not in operation, of information by using light emitted from the light emitting unit provided on the side of the blinker not in operation.

The out-of-vehicle notification device may further include a traveling state detecting unit configured to detect a traveling state of the host vehicle and the light emission control unit may be configured to cause the light emitting units to emit light corresponding to the traveling state detected by the traveling state detecting unit. In this case, the out-of-vehicle notification device can perform notification about the traveling state of the host vehicle by causing the light emitting units to emit light.

According to the aspect of the present disclosure, it is possible to suppress a decrease in visibility of a light emitting unit and a blinker even when the blinker is operated while the light emitting unit is emitting light.

DETAILED DESCRIPTION

Hereinafter, an embodiment of the present disclosure will be described with reference to drawings. Note that, the same elements will be given the same reference numerals in the description of the drawings and description thereof will not be repeated.

Figure 1:
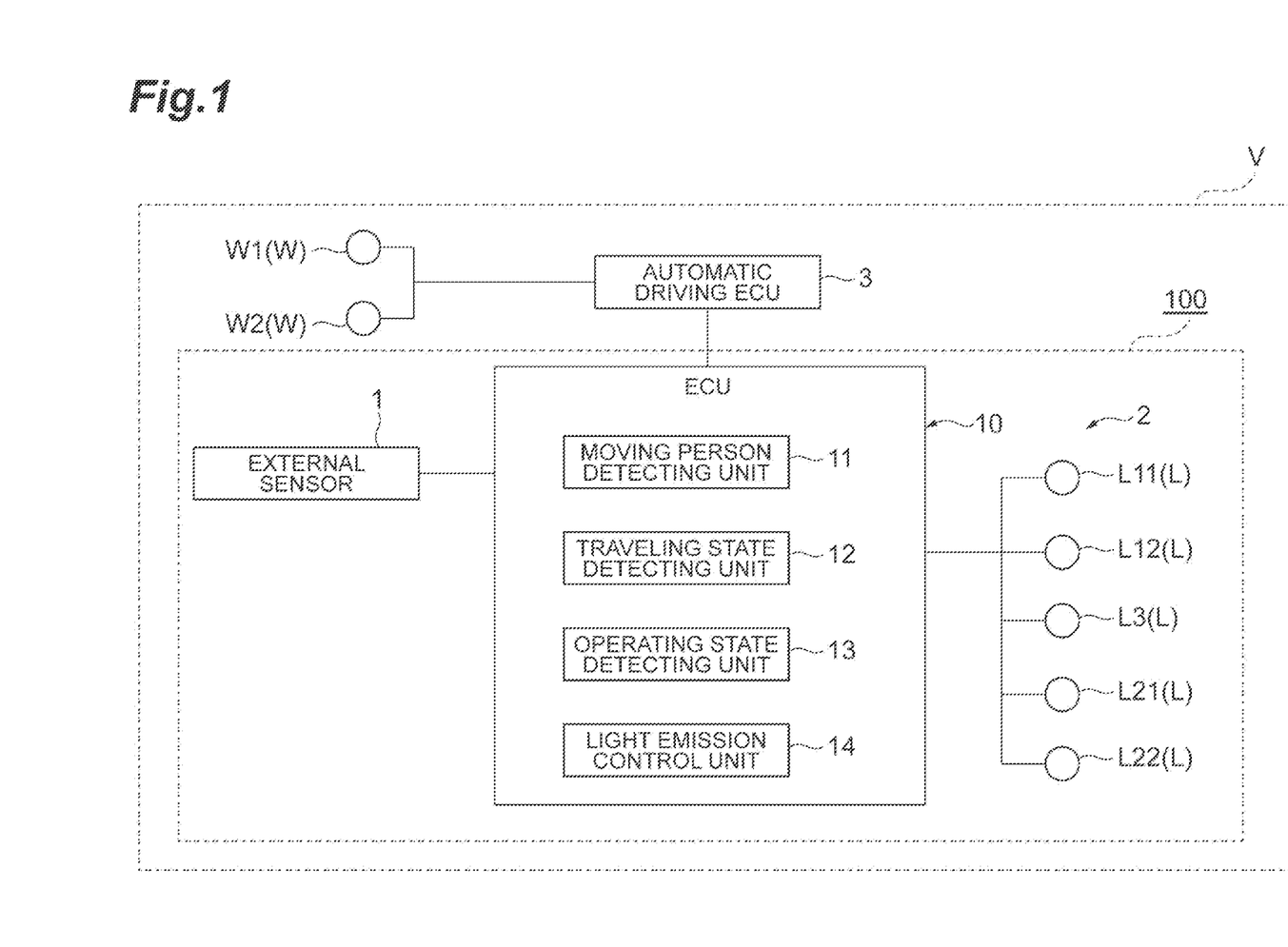
FIG. 1 is a block diagram illustrating an out-of-vehicle notification device according to an embodiment.

As shown in FIG. 1, an out-of-vehicle notification device 100 is a device that is installed in a host vehicle V such as a passenger car that can be automatically driven, the device notifying a moving person in the vicinity of the host vehicle V of information by using light while the host vehicle V is being automatically driven. Automatic driving is vehicle control that causes the host vehicle V to automatically travel along a target route set in advance. In the case of the automatic driving, a driver does not need to perform a driving operation and the host vehicle V travels automatically. The moving person, who may be a target to be notified of information by means of light, is a pedestrian in the vicinity of the host vehicle V, a person on a bicycle, or the like.

The out-of-vehicle notification device 100 is provided with an electronic control unit (ECU) 10 that controls the entire device, an external sensor 1 connected to the ECU 10, and a light emission unit 2. An automatic driving ECU 3 is further connected to the ECU 10. The ECU 10 is an electronic control unit including a central processing unit (CPU), a read only memory (ROM), a random access memory (RAM), a controller area network (CAN) communication circuit, and the like.

The ECU 10 is connected to, for example, a network that performs communication by using the CAN communication circuit and the ECU 10 is connected such that the ECU 10 can communicate with each component of the host vehicle V. That is, the ECU 10 can refer to the result of detection performed by the external sensor 1 and various kinds of information related to traveling control of the host vehicle V from the automatic driving ECU 3. The ECU 10 can output a control signal for controlling light emission of the light emission unit 2.

The ECU 10 loads a program stored in the ROM into the RAM and executes the program loaded in the RAM with the CPU so as to realize out-of-vehicle notification functions which will be described later. The ECU 10 may include a plurality of ECUs.

The external sensor (outside situation detecting unit) 1 is a detecting device that is installed in the host vehicle V and that detects a situation in the vicinity of the host vehicle V. The external sensor 1 includes at least one of a camera and a radar sensor.

The camera is an imaging device that images the outside situation in the vicinity of the host vehicle V. The camera is provided such that the camera can image the vicinity of the host vehicle V. The camera transmits imaging information related to the outside situation of the host vehicle V to the ECU 10. The camera may be a monocular camera and may be a stereo camera. The stereo camera includes two imaging units disposed such that the binocular parallax is realized. Imaging information of the stereo camera includes depth direction information also.

The radar sensor is a detecting device that detects an obstacle in the vicinity of the host vehicle V by using a radio wave (for example, millimeter wave) or light. Examples of the radar sensor include a millimeter wave radar and a light detection and ranging (LIDAR). The radar sensor detects an obstacle by transmitting a radio wave or light to the vicinity of the host vehicle V and receiving the radio wave or light reflected by the obstacle. The radar sensor transmits information about the detected obstacle to the ECU 10. Examples of the obstacle include a moving obstacle such as a pedestrian and a vehicle in addition to a fixed obstacle such as a guardrail and a building.

The light emission unit 2 is provided with a plurality of light emitting units L that is provided on an outer surface of the host vehicle V and that performs notification about information by emitting light. The light emitting unit L is provided with, for example, a light emitting device such as an LED. In the present embodiment, the light emission unit 2 is provided with, specifically, a right upper light emitting unit L11, a right lower light emitting unit L12, a central light emitting unit L3, a left upper light emitting unit L21, and a left lower light emitting unit L22 as the plurality of light emitting units L. The light emitting units L can emit monochromatic light or multi-chromatic light based on control performed by the ECU 10. Furthermore, the light emission state of the light emitting units L can be changed (switch between light emission and lights-out, flickering period, or the like).

Figure 2:
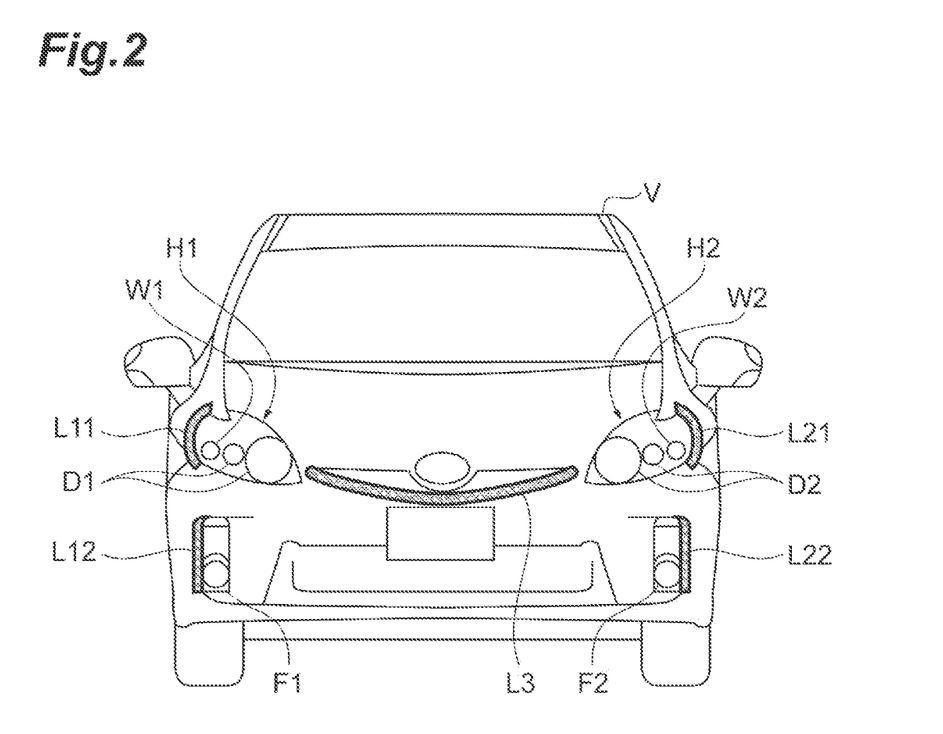
FIG. 2 is a front view of a host vehicle which illustrates a positional relationship between light emitting units, blinkers, and the like provided on a front surface of the host vehicle.

Here, as shown in FIG. 2, a front surface of the host vehicle V is provided with a right head light unit H1, a left head light unit H2, a right fog lamp F1, and a left fog lamp F2. The right head light unit H1 is provided on a right portion of the front surface of the host vehicle V. A right head light D1, a right blinker W1, and the like are incorporated into the right head light unit H1. The right fog lamp F1 is provided below the right head light unit H1.

The left head light unit H2 is provided on a left portion of the front surface of the host vehicle V. A left head light D2, a left blinker W2, and the like are incorporated into the left head light unit H2. The left fog lamp F2 is provided below the left head light unit H2. Hereinafter, the right blinker W1 and the left blinker W2 may be simply referred to as "blinkers W".

The right upper light emitting unit L11 provided on a right portion of the front surface of the host vehicle V. The right upper light emitting unit L11 is provided within a predetermined area around the right blinker W1. The predetermined area may be such a range that it is difficult to recognize light emitted from the right upper light emitting unit L11 and the right blinker W1 while distinguishing between light emitted from the right upper light emitting unit L11 and light emitted from the right blinker W1 when the right upper light emitting unit L11 and the right blinker W1 emit light at the same time, for example. The predetermined area may be an approximately 30 cm area around the right blinker W1 or a smaller area around the right blinker W1, for example. In the present embodiment, the right upper light emitting unit L11 is provided to be adjacent to the right head light unit H1. Note that, the right upper light emitting unit L11 may be incorporated into the right head light unit H1 along with the right blinker W1 and the like.

The right lower light emitting unit L12 is provided on a right portion of the front surface of the host vehicle V. In the present embodiment, the right lower light emitting unit L12 is provided to be adjacent to the right fog lamp F1. In addition, the right lower light emitting unit L12 is provided at a position outside the predetermined area around the right blinker W1.

The left upper light emitting unit L21 provided on a left portion of the front surface of the host vehicle V. The left upper light emitting unit L21 is provided within a predetermined area around the left blinker W2. The predetermined area may be such a range that it is difficult to recognize light emitted from the left upper light emitting unit L21 and the left blinker W2 while distinguishing between light emitted from the left upper light emitting unit L21 and light emitted from the left blinker W2 when the left upper light emitting unit L21 and the left blinker W2 emit light at the same time, for example. The predetermined area may be an approximately 30 cm area around the left blinker W2 or a smaller area around the left blinker W2, for example. In the present embodiment, the left upper light emitting unit L21 is provided to be adjacent to the left head light unit H2. Note that, the left upper light emitting unit L21 may be incorporated into the left head light unit H2 along with the left blinker W2 and the like.

The left lower light emitting unit L22 is provided on a left portion of the front surface of the host vehicle V. In the present embodiment, the left lower light emitting unit L22 is provided to be adjacent to the left fog lamp F2. In addition, the left lower light emitting unit L22 is provided outside the predetermined area around the left blinker W2.

The central light emitting unit L3 is provided on the central portion of the front surface of the host vehicle V. The central light emitting unit L3 is provided at the position of a front grille of the host vehicle V, for example. In the present embodiment, the central light emitting unit L3 is provided outside the predetermined area around the right blinker W1 and is provided outside the predetermined area around the left blinker W2. Note that, FIG. 2 shows a state where light is emitted from all of the light emitting units L.

The automatic driving ECU 3 executes automatic driving of the host vehicle V. The automatic driving ECU 3 is an electronic control unit including a CPU, a ROM, a RAM, a CAN communication circuit, and the like. The automatic driving ECU 3 is connected to a map data base storing map information, a position measuring unit that measures the position of the host vehicle V in a map with a global positioning system (GPS), various actuators for causing the host vehicle V to travel, and various sensors including the external sensor 1.

The automatic driving ECU 3 is connected to a network that performs communication by using, for example, the CAN communication circuit and is connected such that the automatic driving ECU 3 can communicate with each component of the host vehicle V. That is, the automatic driving ECU 3 can refer the map information of the map data base, information about the position of the host vehicle V in the map that is measured by the position measuring unit, and the result of detection performed by the various sensors. The ECU 10 can output signals to the various actuators.

The automatic driving ECU 3 loads a program stored in the ROM into the RAM and executes the program loaded in the RAM with the CPU so as to realize functions of an automatic driving system installed in the host vehicle V. The automatic driving ECU 3 may include a plurality of ECUs.

The map information of the map data base includes, for example, position information of a road (position information for each lane), information about the shape of a road (for example, information about type of curve or straight portion, curvature of curve, or like), information about the width of a road (information about width of lane), information about the slope of a road, information about the cant angle of a road, information about the speed limit for a road, and information about a road marking such as a crosswalk provided on a road. The various actuators include a steering actuator that controls the steering angle of the host vehicle V, a brake actuator that controls a brake system of the host vehicle V, and an engine actuator that controls an engine of the host vehicle V (or motor of electric car).

The automatic driving ECU 3 searches for a target route from the current position of the host vehicle V to a destination based on the map information of the map data base, the information about the position of the host vehicle V in the map that is measured by the position measuring unit, and a destination set in advance. The automatic driving ECU 3 generates a traveling plan for causing the host vehicle V to travel along the target route. The traveling plan includes, for example, a moving route and a moving speed. The automatic driving ECU 3 generates the traveling plan of the host vehicle V by using a known method. The automatic driving ECU 3 executes automatic driving of the host vehicle V according to the traveling plan based on the information about the position of the host vehicle V in the map that is measured by the position measuring unit. In addition, the automatic driving ECU 3 transmits the generated traveling plan to the ECU 10. The automatic driving ECU 3 executes the automatic driving by controlling the host vehicle V by transmitting a control signal to the various actuators.

In addition, when changing lanes while the automatic driving is being executed, the automatic driving ECU 3 operates the right blinker W1 or the left blinker W2 to notify another vehicle in the vicinity of the host vehicle V of the lane change.

The ECU 10 includes a moving person detecting unit 11, a traveling state detecting unit 12, an operating state detecting unit 13, and a light emission control unit 14. Note that, a portion of the functions of the ECU 10 may be executed by a computer in a facility such as an information management center that can communicate with the host vehicle V and may be executed by a portable information terminal that can communicate with the host vehicle V.

The moving person detecting unit 11 detects a moving person in the vicinity of the host vehicle V based on the result of detection performed by the external sensor 1. The moving person detecting unit 11 can detect the moving person by using a known method based on the result of detection performed by the external sensor 1.

Furthermore, the moving person detecting unit 11 detects a moving person who is to be notified of information by means of light from among detected moving persons. In the present embodiment, the moving person detecting unit 11 may detect a moving person expected to cross over a road in front of the host vehicle V as the moving person to be notified. In addition, the moving person detecting unit 11 may detect a moving person within a predetermined area around the host vehicle V as the moving person to be notified. The moving person detecting unit 11 can detect the moving person to be notified by using a known method based on the result of detection performed by the external sensor 1. For example, the moving person detecting unit 11 may determine whether a moving person is the moving person expected to cross over a road (moving person to be notified) or not based on a change in position of the moving person (vector).

The traveling state detecting unit 12 detects the traveling state of the host vehicle V. In the present embodiment, the traveling state detecting unit 12 can detect the traveling state based on the traveling plan generated by the automatic driving ECU 3. The traveling state detecting unit 12 detects whether the host vehicle V is in a normal traveling state or not, whether the host vehicle V is decelerating or not, whether the host vehicle V is stopped or not, or the like as the traveling state. Note that, the traveling state detecting unit 12 may detect the traveling state based on information other than the traveling plan by using the speed of the host vehicle V or the like.

The operating state detecting unit 13 detects the operating states of the right blinker W1 and the left blinker W2 of the host vehicle V. The operating state detecting unit 13 may detect the operating state of the right blinker W1 or the like based on the situation of control of the right blinker W1 or the like which is performed by the automatic driving ECU 3. Note that, the operating state detecting unit 13 may be configured to directly detect the operating state of the right blinker W1 or the like.

The light emission control unit 14 causes the light emitting units L constituting the light emission unit 2 to emit light when the moving person detecting unit 11 detects the moving person to be notified. When the moving person to be notified is not detected by the moving person detecting unit 11, the light emission control unit 14 does not cause the light emitting units L to emit light.

In addition, the light emission control unit 14 causes the light emitting units L to emit light corresponding to the traveling state detected by the operating state detecting unit 13. That is, the light emission control unit 14 determines a light emission state corresponding to the detected traveling state. Light emission states corresponding to traveling states are set in advance.

The light emission states corresponding to traveling states are as follows. For example, when the traveling state of the host vehicle V is a traveling state in which the host vehicle V is decelerating, the light emission control unit 14 causes the light emitting units L to emit orange light in a flickering manner. For example, when the traveling state of the host vehicle V is a traveling state in which the host vehicle V is stopped, the light emission control unit 14 causes the light emitting units L to emit green light continuously. For example, when the traveling state of the host vehicle V is a traveling state in which the host vehicle V in a stopped state will depart, the light emission control unit 14 causes the light emitting units L to emit green light in a flickering manner. In this manner, the light emission control unit 14 causes the light emitting units L of the light emission unit 2 to emit light so as to perform notification about the traveling state of the host vehicle V.

Here, the light emission control unit 14 controls light emission of the light emitting units L corresponding to the operating state of the blinker W. When the operating state detecting unit 13 detects an operation of the blinker W, the light emission control unit 14 forbids light emission of the light emitting unit L that is provided within a predetermined area around the blinker W in operation. Specifically, when the operating state detecting unit 13 detects an operation of the right blinker W1, the light emission control unit 14 forbids light emission of the right upper light emitting unit L11 that is provided within the predetermined area around the right blinker W1 in operation. Similarly, when the operating state detecting unit 13 detects an operation of the left blinker W2, the light emission control unit 14 forbids light emission of the left upper light emitting unit L21 that is provided within the predetermined area around the left blinker W2 in operation.

Furthermore, when the operating state detecting unit 13 detects an operation of the blinker W, the light emission control unit 14 forbids light emission of the light emitting units L that are provided on the side of the blinker W in operation from among the plurality of light emitting units L and the light emission control unit 14 does not forbid light emission of the light emitting units L that are provided on the side of the blinker W not in operation. Specifically, when an operation of the right blinker W1 is detected, the light emission control unit 14 forbids light emission of the right lower light emitting unit L12 provided on the right side of the host vehicle V in addition to light emission of the right upper light emitting unit L11 and does not forbid light emission of the left upper light emitting unit L21 and the left lower light emitting unit L22 which are provided on the left side of the host vehicle V. Similarly, when an operation of the left blinker W2 is detected, the light emission control unit 14 forbids light emission of the left lower light emitting unit L22 provided on the left side of the host vehicle V in addition to light emission of the left upper light emitting unit L21 and does not forbid light emission of the right upper light emitting unit L11 and the right lower light emitting unit L12 which are provided on the right side of the host vehicle V.

Note that, the central light emitting unit L3 is provided on the central portion of the front surface of the host vehicle V. Therefore, it is considered that a moving person is less likely to confuse light emitted from the blinkers W and light emitted from the central light emitting unit L3 even when the blinkers W and the central light emitting unit L3 emit light at the same time. Therefore, the light emission control unit 14 performs notification with respect to the moving person to be notified by causing the central light emitting unit L3 to emit light regardless of the operating states of the blinkers W. Note that, since it is considered that a moving person is less likely to confuse light emitted from the blinkers W and light emitted from the central light emitting unit L3, a portion of the central light emitting unit L3 may be present in the predetermined area around the right blinker W1. Similarly, a portion of the central light emitting unit L3 may be present in the predetermined area around the right blinker W1.

Next, the light emission state of the light emission unit 2 at a time when the moving person to be notified is detected by the moving person detecting unit 11 will be described with reference to drawings. For example, as shown in FIG. 2, when the right blinker W1 and the left blinker W2 are not in operation, the light emission control unit 14 causes all of the light emitting units L constituting the light emission unit 2 such as the right upper light emitting unit L11 to emit light.

Figure 3:
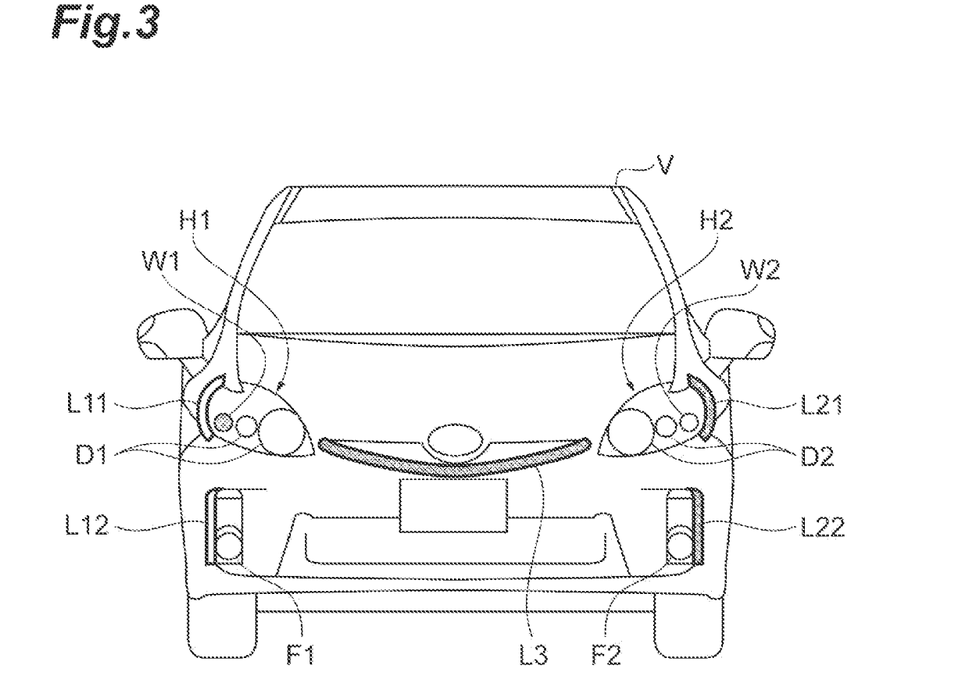
FIG. 3 is a view illustrating the light emission state of each light emitting unit with a right blinker being in operation.

For example, as shown in FIG. 3, when the right blinker W1 is in operation, the light emission control unit 14 forbids light emission of the right upper light emitting unit L11 and the right lower light emitting unit L12 and causes the left upper light emitting unit L21, the left lower light emitting unit L22, and the central light emitting unit L3 to emit light. Therefore, a moving person in the vicinity of the host vehicle V can visually recognize light emitted from the right blinker W1 and light emitted from the light emitting units (left upper light emitting unit L21, left lower light emitting unit L22, and central light emitting unit L3), while distinguishing between light (flickering) emitted from the right blinker W1 in operation and light emitted from the light emitting units (left upper light emitting unit L21, left lower light emitting unit L22, and central light emitting unit L3). Note that, in FIG. 3, the light emitting units L and the blinker W emitting light are illustrated being black-painted and the light emitting units L and the blinker W not emitting light are illustrated being white-painted. The same applies to FIG. 4.

Figure 4:
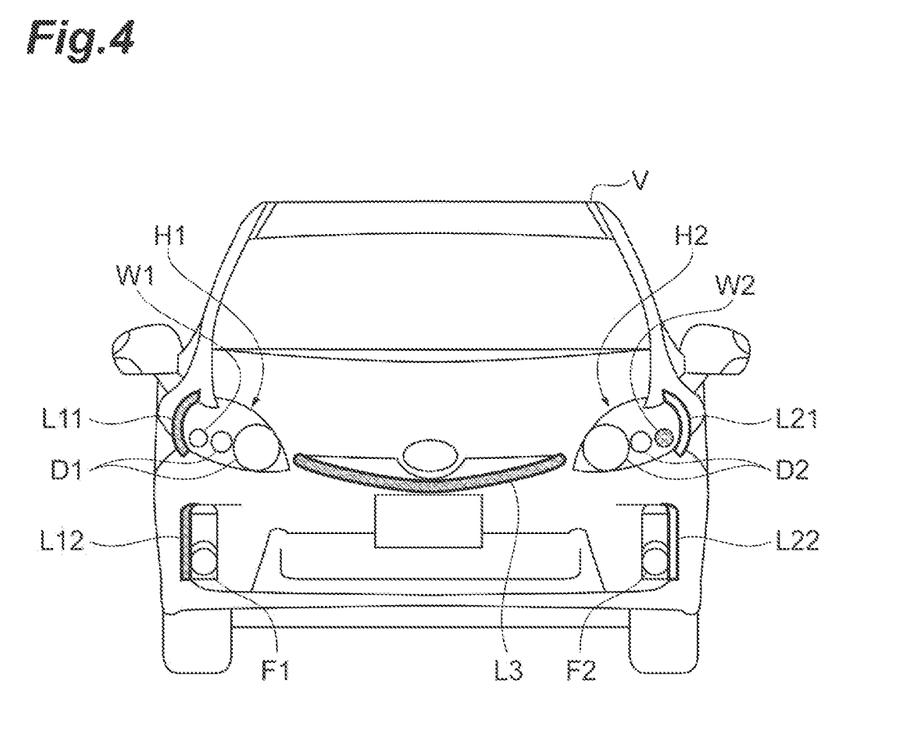
FIG. 4 is a view illustrating the light emission state of each light emitting unit with a left blinker being in operation.

For example, as shown in FIG. 4, when the left blinker W2 is in operation, the light emission control unit 14 forbids light emission of the left upper light emitting unit L21 and the left lower light emitting unit L22 and causes the right upper light emitting unit L11, the right lower light emitting unit L12, and the central light emitting unit L3 to emit light. Therefore, a moving person in the vicinity of the host vehicle V can visually recognize flickering of the left blinker W2 and light emitted from the light emitting units (right upper light emitting unit L11, right lower light emitting unit L12, and central light emitting unit L3), while distinguishing between light (flickering) emitted from the left blinker W2 in operation and light emitted from the light emitting units (right upper light emitting unit L11, right lower light emitting unit L12, and central light emitting unit L3).

Figure 5:
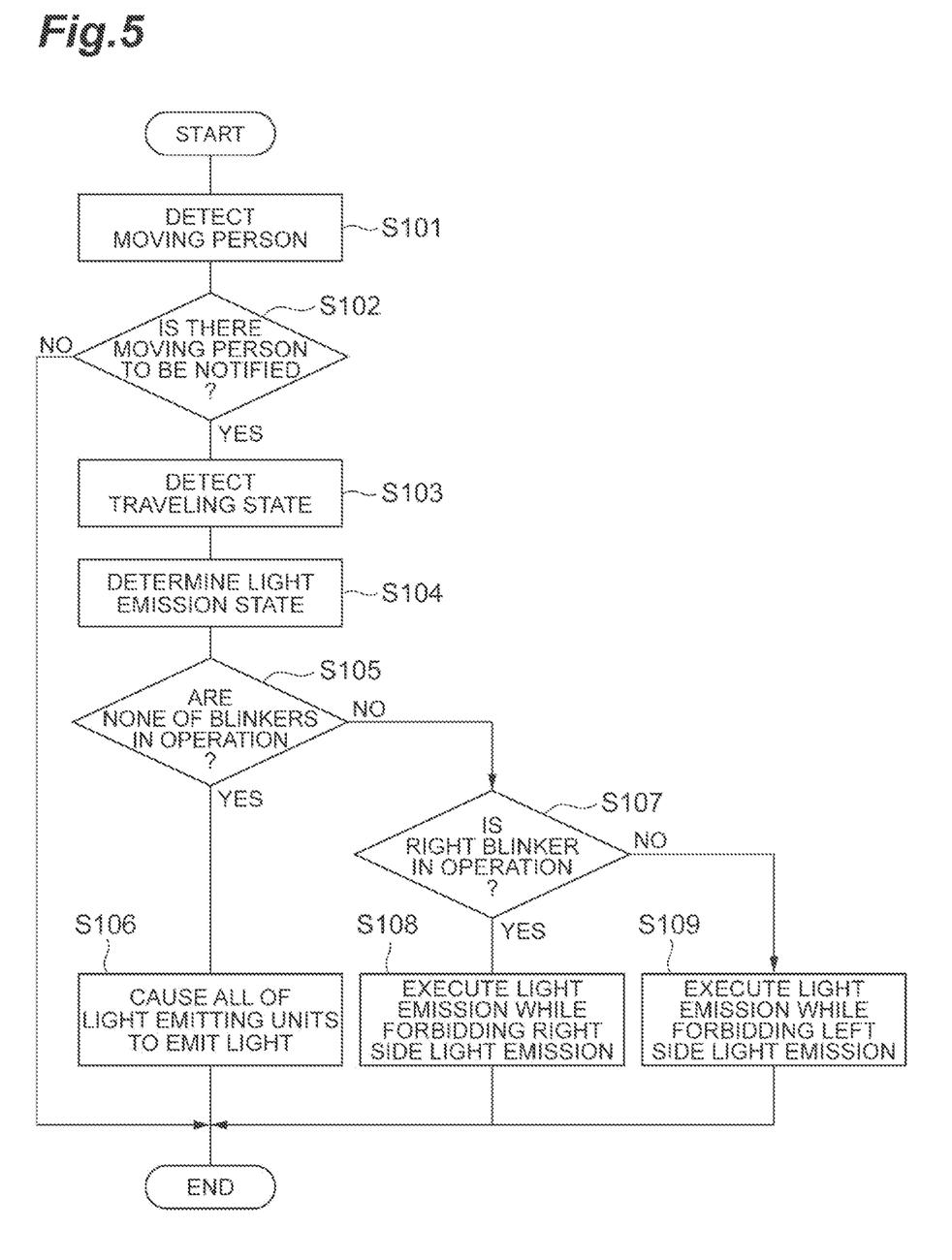
FIG. 5 is a flowchart illustrating the flow of a process in which the out-of-vehicle notification device causes a light emission unit to emit light.

Next, the flow of a process in which the out-of-vehicle notification device 100 causes the light emitting units L of the light emission unit 2 to emit light will be described by using a flowchart in FIG. 5. Note that, the process shown in FIG. 5 is restarted from the start when a predetermined time elapses after the process reaches the end. In addition, the process shown in FIG. 5 is executed while the host vehicle V is being automatically driven.

As shown in FIG. 5, the moving person detecting unit 11 detects a moving person in the vicinity of the host vehicle V based on the result of detection performed by the external sensor 1 (S101). The moving person detecting unit 11 determines whether there is a moving person to be notified such as a pedestrian expected to cross over a road in front of the host vehicle V based on the result of the detection performed by the external sensor 1 (S102). When there is no moving person to be notified (S102: NO), the out-of-vehicle notification device 100 terminates the current process and restarts the process from the start after the predetermined time elapses.

When there is a moving person to be notified (S102: YES), the traveling state detecting unit 12 detects the traveling state of the host vehicle V (S103). The light emission control unit 14 determines the light emission state at the time of notification performed by means of light emitted from the light emission unit 2 based on the traveling state detected by the traveling state detecting unit 12 (S104). The light emission control unit 14 determines whether the right blinker W1 and the left blinker W2 are in operation or not (whether right blinker W1 and left blinker W2 are in operation-stopped state) based on the result of detection performed by the operating state detecting unit 13 (S105). When none of the right blinker W1 and the left blinker W2 are in operation (S105: YES), the light emission control unit 14 performs notification by causing all of the light emitting units L constituting the light emission unit 2 to emit light such that the light emission state determined in S104 is achieved (S106).

Meanwhile, when any one of the right blinker W1 and the left blinker W2 is in operation (S105: NO), the light emission control unit 14 determines whether the right blinker W1 is in operation or not (S107). When the right blinker W1 is in operation (S107: YES), the light emission control unit 14 forbids light emission of the right upper light emitting unit L11 and the right lower light emitting unit L12 provided on the right side. In addition, the light emission control unit 14 performs notification while causing the left upper light emitting unit L21, the left lower light emitting unit L22, and the central light emitting unit L3 to emit light such that the light emission state determined in S104 is achieved (S108).

In addition, when the left blinker W2 is in operation (S107: NO), the light emission control unit 14 forbids light emission of the left upper light emitting unit L21 and the left lower light emitting unit L22 provided on the left side. In addition, the light emission control unit 14 performs notification while causing the right upper light emitting unit L11, the right lower light emitting unit L12, and the central light emitting unit L3 to emit light such that the light emission state determined in S104 is achieved (S109).

As described above, when an operation of the blinker W is detected, the light emission control unit 14 forbids light emission of the light emitting unit L (right upper light emitting unit L11 or left upper light emitting unit L21) that is provided within the predetermined area around the blinker W in operation. That is, when an operation of the blinker W is detected, only the light emitting unit L that is provided at a position separated from the blinker W in operation emits light, from among the plurality of light emitting units L. Therefore, the moving person in the vicinity of the host vehicle V can visually recognize light emitted from the light emitting unit L and light emitted from the blinker W while distinguishing between the light emitted from the light emitting unit L and the light (flickering) emitted from the blinker W with ease. As described above, the out-of-vehicle notification device 100 can suppress a decrease in visibility of the light emitting unit L and the blinker W even when the blinker W is operated while the light emitting unit L is emitting light.

In addition, when an operation of the blinker W is detected, the light emission control unit 14 forbids light emission of the light emitting units L that are provided on the side of the blinker W in operation from among the plurality of light emitting units L and the light emission control unit 14 does not forbid light emission of the light emitting units L that are provided on the side of the blinker W not in operation. In this manner, the out-of-vehicle notification device 100 can also forbid light emission of the light emitting unit (right lower light emitting unit L12 and left lower light emitting unit L22) provided at a position separated from the blinker W according to the operating state of the blinker W. Therefore, the moving person can visually recognize the blinker W in operation without being confused by light emitted from the light emitting units L provided on the side of the blinker W in operation. In addition, the out-of-vehicle notification device 100 can notify a moving person, who is on the side of the blinker W not in operation, of information by using light emitted from the light emitting units L provided on the side of the blinker W not in operation.

The light emission control unit 14 causes the light emitting units L to emit light corresponding to the traveling state of the host vehicle V. In this case, the out-of-vehicle notification device 100 can notify a moving person of the traveling state of the host vehicle V by using light emitted from the light emitting units L.

Figure 6:
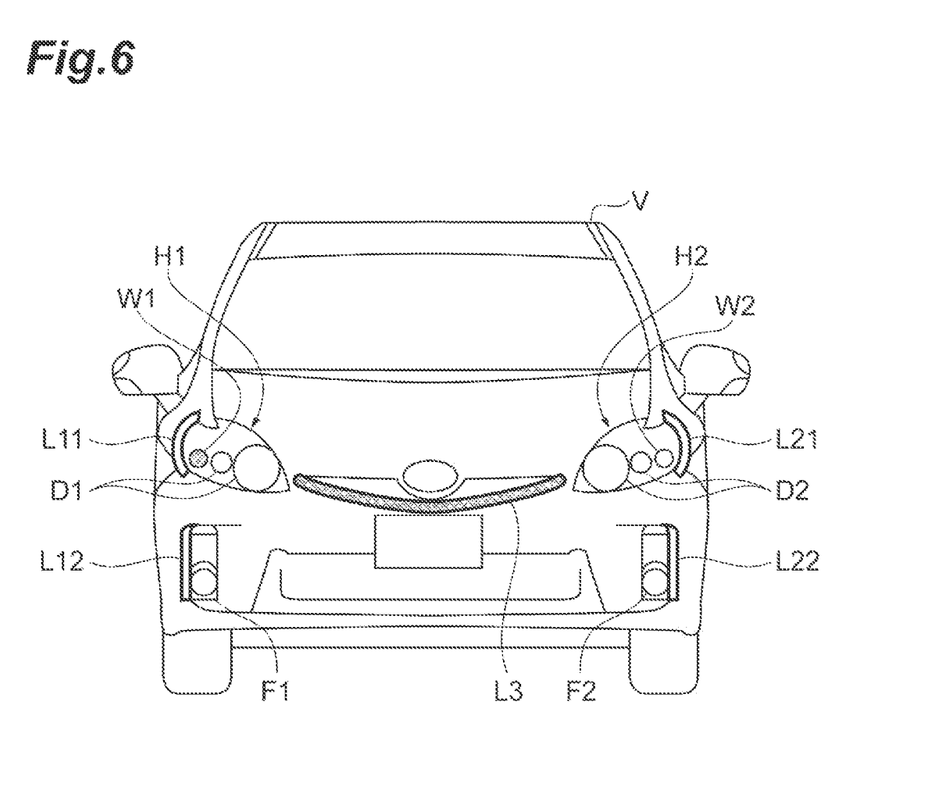
FIG. 6 is a view illustrating a modification example of the light emission state of each light emitting unit with the right blinker being in operation.

Hereinabove, the embodiment of the present disclosure has been described. However, the present disclosure is not limited to the above-described embodiment. For example, the light emission control unit 14 may forbid light emission of the light emitting units L other than the central light emitting unit L3 when an operation of the right blinker W1 is detected as shown in FIG. 6. Similarly, the light emission control unit 14 may forbid light emission of the light emitting units L other than the central light emitting unit L3 when an operation of the left blinker W2 is detected as shown in FIG. 6. In this case, the out-of-vehicle notification device 100 can improve the visibility of the blinkers W.

In addition, examples of the moving person to be notified by the out-of-vehicle notification device 100 may include a driver of a manually driven vehicle traveling within a predetermined area around the host vehicle V in addition to a pedestrian and a person on a bicycle. For example, the moving person detecting unit 11 may specify an automatically driven vehicle through wireless communication with vehicles traveling in the vicinity of the host vehicle V and detect a vehicle other than the specified automatically driven vehicle as a manually driven vehicle. In this case, the driver of the manually driven vehicle can figure out the traveling state of the host vehicle V by visually recognizing light emitted from the light emitting units L.

The light emission control unit 14 may not perform notification about the traveling state of the host vehicle V by using light. The light emission control unit 14 may perform notification about information other than the traveling state by using light.

The light emitting units L may be provided at positions other than the front surface of the host vehicle V. In addition, although the right blinker W1 and the left blinker W2 provided on the front surface of the host vehicle V have been described as an example, light emission of the light emitting units that are provided in the vicinity of a blinker provided at a position other than the front surface of the host vehicle V may be forbidden.

The out-of-vehicle notification device 100 may not be installed in an automatically driven vehicle. The out-of-vehicle notification device 100 may be installed in a manually driven vehicle.

What is claimed is:

1. A method for notifying a person in a vicinity of a host vehicle of information with a plurality of indicators provided on the host vehicle, the method comprising:
   detecting a situation in the vicinity of the host vehicle;
   detecting operating states of a first blinker and a second blinker of the host vehicle;
   emitting light from the plurality of indicators when the person is detected; and
   when operation of the first blinker or the second blinker is detected, forbidding one of the plurality of indicators that is provided within a predetermined area around the blinker in operation from emitting light and permitting another of the plurality of indicators that is provided outside the predetermined area of the blinker not in operation to emit light when the person is detected.

2. The method according to claim 1, wherein the another of the plurality of indicators is provided on a central portion of a front surface of the host vehicle.

3. The method according to claim 1, further comprising:
   detecting a traveling state of the host vehicle; and
   emitting light from the plurality of indicators corresponding to the traveling state of the host vehicle.

4. The method according to claim 1, wherein the person is a pedestrian, a person on a bicycle, or a driver of another vehicle.

5. An out-of-vehicle notification device for notifying a person in a vicinity of a host vehicle of information with light, the device comprising:
   an outside situation detector configured to detect a situation in the vicinity of the host vehicle;
   a person detector configured to detect the person;
   a plurality of indicators provided on the host vehicle configured to perform notification about information by emitting light based on a result of detection performed by the outside situation detector;
   a light emission controller configured to cause the plurality of indicators to emit light when the person detector detects the person; and
   an operating state detector configured to detect operating states of a first blinker and a second blinker of the host vehicle, wherein
   when an operation of the first blinker or the second blinker is detected, the light emission controller is configured to forbid one of the plurality of indicators that is provided within a predetermined area around the blinker in operation to emit light and permit another of the plurality of indicators that is provided outside the predetermined area of the blinker not in operation to emit light when the person is detected.

6. The out-of-vehicle notification device according to claim 5, wherein the another of the plurality of indicators is provided on a central portion of a front surface of the host vehicle.

7. The out-of-vehicle notification device according to claim 5, further comprising:
   a traveling state detector configured to detect a traveling state of the host vehicle,
   wherein the light emission controller is configured to cause the plurality of indicators to emit light corresponding to the traveling state detected by the traveling state detector.

8. The out-of-vehicle notification device according to claim 5, wherein the person is a pedestrian, a person on a bicycle, or a driver of another vehicle.

9. A non-transitory computer-readable storage medium in which computer program code for notifying a person in a vicinity of a host vehicle of information with light is stored, the computer program code causing at least one processor to:
   detect a situation in the vicinity of the host vehicle;
   detect operating states of a first blinker and a second blinker;
   cause a plurality of indicators to emit light when the person is detected; and
   when operation of the first blinker or the second blinker is detected, forbid one of the plurality of indicators that is provided within a predetermined area around the blinker in operation from emitting light, and permit another of the plurality of indicators that is provided outside the predetermined area of the blinker not in operation to emit light when the person is detected.

10. The non-transitory computer-readable storage medium according to claim 9, wherein the another of the plurality of indicators is provided on a central portion of a front surface of the host vehicle.

11. The non-transitory computer-readable storage medium according to claim 9, wherein the computer program code further causes the at least one processor to:
   detect a traveling state of the host vehicle; and
   cause the plurality of indicators to emit light corresponding to the traveling state of the host vehicle.

12. The non-transitory computer-readable storage medium according to claim 9, wherein the person is a pedestrian, a person on a bicycle, or a driver of another vehicle.

* * * * *